(12) United States Patent
Winters

(10) Patent No.: US 7,334,711 B1
(45) Date of Patent: Feb. 26, 2008

(54) ARTICLE FOR TRANSPORTING AN ELECTRONIC DEVICE

(76) Inventor: Jeffery B. Winters, 106 Blue Jay Ct., Fayetteville, NC (US) 28306

( * ) Notice: Subject to any disclaimer, the term of this patent is extended or adjusted under 35 U.S.C. 154(b) by 498 days.

(21) Appl. No.: 10/845,989

(22) Filed: May 14, 2004

(51) Int. Cl.
*A45C 3/14* (2006.01)
*A45F 3/14* (2006.01)

(52) U.S. Cl. .................. 224/217; 224/218; 224/219

(58) Field of Classification Search ........... 224/217, 224/218
See application file for complete search history.

(56) References Cited

U.S. PATENT DOCUMENTS

| | | | | |
|---|---|---|---|---|
| 4,504,980 A | * | 3/1985 | Butcher | 2/160 |
| 5,412,545 A | * | 5/1995 | Rising | 362/105 |
| 5,853,210 A | * | 12/1998 | Robinson | 294/25 |
| 6,024,715 A | * | 2/2000 | Maxwell | 602/64 |
| 6,227,424 B1 | * | 5/2001 | Roegner | 224/219 |
| 6,360,928 B1 | * | 3/2002 | Russo | 224/218 |
| 7,033,331 B1 | * | 4/2006 | Hely | 602/21 |
| 2004/0172736 A1 | * | 9/2004 | Reid | 2/169 |
| 2004/0182897 A1 | * | 9/2004 | Andrews et al. | 224/274 |

FOREIGN PATENT DOCUMENTS

DE 20209873 U1 * 10/2002
EP 0979624 A2 * 7/2000

* cited by examiner

*Primary Examiner*—Nathan J. Newhouse
*Assistant Examiner*—Lester L. Vanterpool

(57) ABSTRACT

An article to transport one or more small electronic devices on a wearer is provided whereby each electronic device is portable and is readily accessible. The electronic device can be, for example, a mobile telephone, a personal data assistant ("PDA"), a global positioning system ("GPS"), a personal gaming system, and the like, attached to the worn article by means such as an adhesive, hook and loop fasteners, a snap system, or a clip assembly, and securable to the wearer by one or more flexible, elastic straps which conform to the contours of the wearer.

15 Claims, 4 Drawing Sheets

ARTICLE FOR TRANSPORTING AN ELECTRONIC DEVICE

FIELD OF THE INVENTION

The invention herein pertains to articles for wearing electronic devices and particularly pertains to articles for wearing on an extremely.

DESCRIPTION OF THE PRIOR ART AND OBJECTIVES OF THE INVENTION

As technology advances, the size of electronic devices continues to shrink enabling them to be viable mobile devices. Mobile telephones, personal data assistance, global positioning devices, personal computer, and personal entertainment systems are some of the most commonly recognized mobile electronic devices.

Although the user of an electronic device may transport it in a bag carried by a shoulder strap or handle, or push or pull it in a wheeled container, the electronic device is not readily accessible as it is not on the user's body. Shirt, pant or jacket pockets may provide additional means to transport an electronic device, but such pockets generally obscure the view of the electronic device and interfere with instant access to and manipulation thereof. Belt clips are also available as an alternative to transport the electronic device on the user but accessibility problems are inherent with belt clips as a jacket or a shirt or the positioning of the user can create obstacles and interfere with the user's ability to view or manipulate the electronic device as carried.

The problems with carrying an electronic device in a bag, pocket or with a clip are magnified when the user is active or has physical limitations that prevent simultaneous manipulation.

Thus, with the problems and disadvantages of previous carrying and attachment devices, the present invention was conceived and one of its objectives is to provide an inexpensive and easily manufactured article to which an electronic device can be attached and transported by a wearer.

It is also an objective of the present invention to provide an article that is easily secured and removed from a wearer's extremity with one or more straps.

It is another objective of the present invention to provide an article with a stiffening member to provide increased stability at the attachment site for an electronic device.

It is yet a further objective of the present invention to provide an article whereby the means for attachment of an electronic device permits attachment, removal, and re-attachment thereof.

It is still a further objective of the present invention to provide an article which will allow quick and easy access to the attached electronic device.

It is yet a further objective of the present invention to provide an article which can be worn on the hand to transport a mobile telephone.

Various other objectives and advantages of the present invention will become apparent to those skilled in the art as a more detailed description is set forth below.

SUMMARY OF THE INVENTION

The aforesaid and other objectives are realized by providing an article for attaching an electronic device to which includes a strap that can be worn by the user to maintain control and use of the electronic device at all times. The means of attaching the electronic device to the article may be permanently or removably affixed such as by an adhesive, hook and loop fasteners, a button assembly, or a snap mechanism. A removable attachment means is preferred as it permits attachment, removal, and re-attachment of the electronic device and enables the article to be used for multiple electronic devices. An attachment means that also permits rotation of the electronic device keeps it at a preferred angle on the article despite motion of the wearer's extremity. Multiple electronic devices can be carried at the same time by multiple attachment means.

Additionally, adding a stiffening member to the article can improve the stability of the electronic device thereon. An adjustable strap improves the fit of the article whereas a plurality of straps improves the stability.

When the strap or straps of the article are adjustable, the article better conforms to the contours of the wearer and provides for a more secure fit. The strap can be made with a woven material and preferably an elastic material. The strap is either joined to form an endless band or may incorporate hook and loop fasteners, a buckle assembly, or an adhesive whereby the wearer can join the ends of the strap. An adhesive which allows for repeated, non-setting adhesion and removal of the electronic device while maintaining adhesive properties is preferred.

BRIEF DESCRIPTION OF THE DRAWINGS

FIG. 1A demonstrates an enlarged view of the open end of the pocket seen in FIG. 1;

DETAILED DESCRIPTION OF THE PREFERRED EMBODIMENT AND OPERATION OF THE INVENTION

Figure 1:
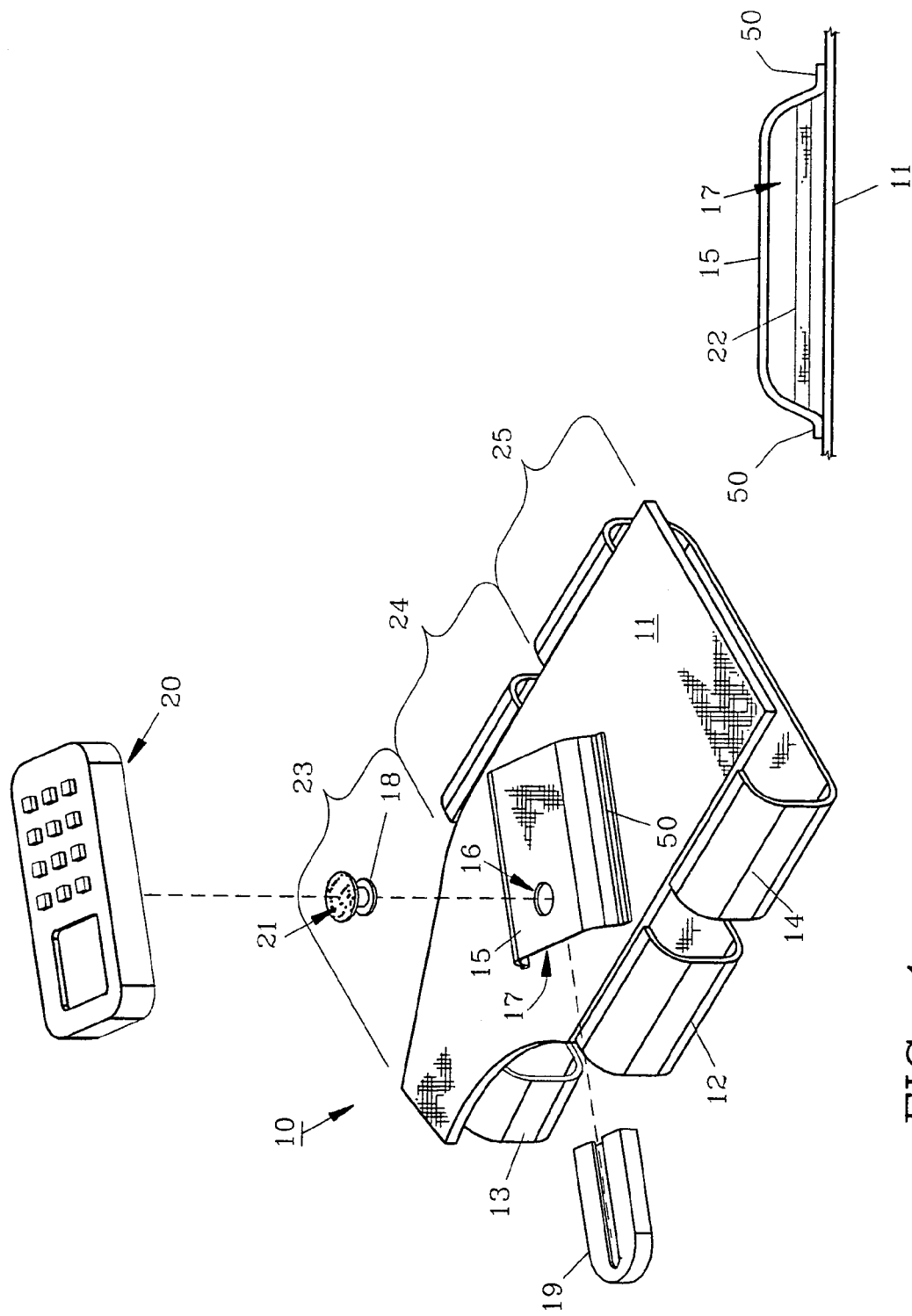
FIG. 1 depicts a perspective view of the preferred embodiment of an article for transporting an electronic device with conventional components exploded therefrom.
Figure 4:
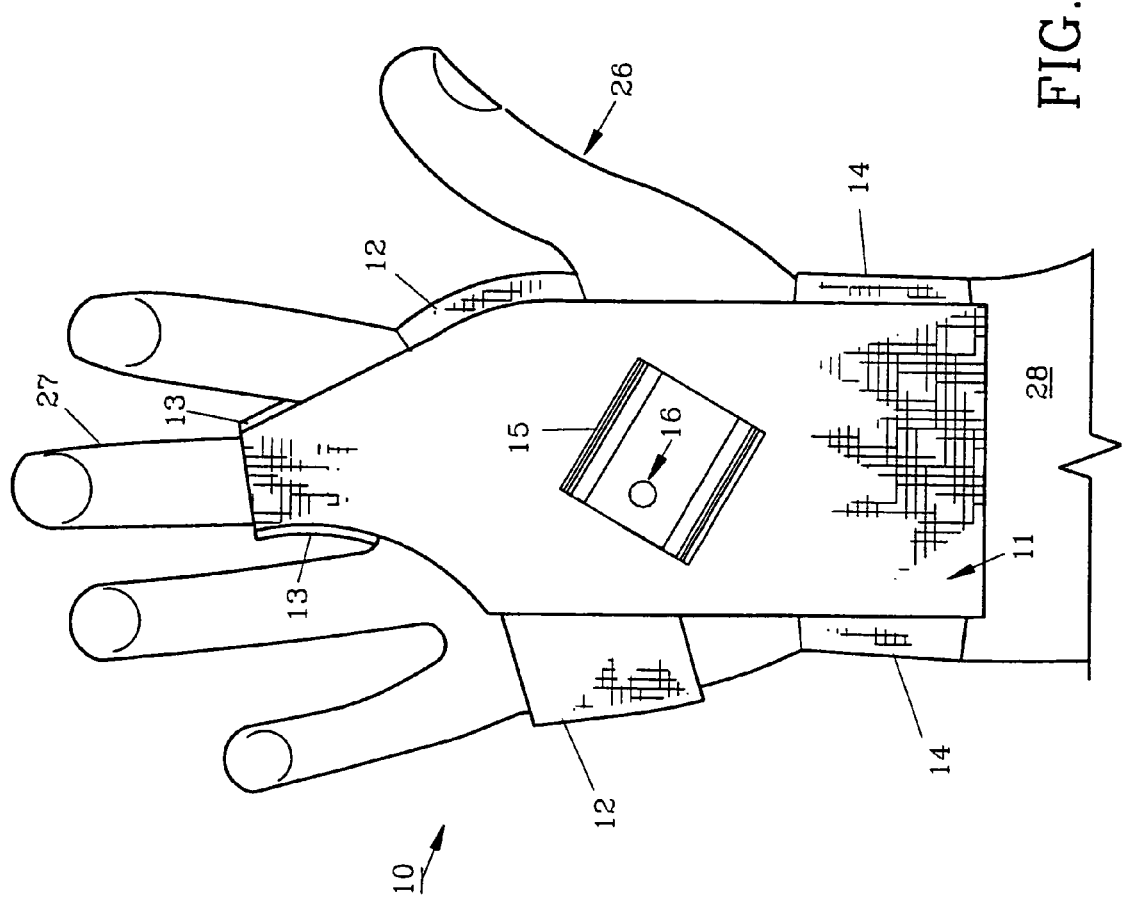
FIG. 4 depicts the preferred embodiment of an article for transporting an electronic device worn by a user.

For a better understanding of the invention and its operation, turning now to the drawings, specifically FIGS. 1 and 4 show preferred article 10 which is used for transporting an attachable electronic device, such as mobile telephone 20 on the extremity of a wearer. FIG. 4 shows a top view of preferred article 10 as adorned on the back of left hand 26, extending from wrist 28 to middle finger 27 of hand 26. Although article 10 is shown positioned on a left hand, use on a right hand is also contemplated.

Article 10 includes preferred body 11 which is preferably flexible and is shown as a single woven nylon fabric layer while a multi-layered body is also contemplated, but not shown. Body 11 comprises three (3) main zones, upper portion 23, middle portion 24, and lower portion 25 each joined successively to one another. FIGS. 1 and 4 also show a plurality of stretchably adjustable endless straps 12, 13, and 14 joined to body 11 whereby first strap 12 is joined to middle portion 24 to engage the palm of hand 26. Second strap 13 is joined to upper portion 23 to engage finger 27 of hand 26, preferably the middle finger, and is narrower and shorter than first and third straps 12, 14. Third strap 14 is joined to lower portion 25 to engage wrist 28 of hand 26. The preferred material for straps 12, 13, and 14 is a conventional woven elastic fabric of a size resiliently fit and of a length that provides sufficient restraint to prevent undesired rotation and movement when worn.

FIGS. 1 and 1A show pocket 15 attached to body 11 with preferably an adhesive (not seen), though affixing pocket 15 to body 11 with stitching is also contemplated. Pocket 15 defines aperture 16 and a chamber having open end 17 partially closed by elastic securing strap 22 which is attached at both ends to pocket 15. Pocket edges 50 are affixed to body 11 as shown in FIGS. 1 and 1A. The preferred material for pocket 15 is a flexible fabric similar to that used for body 11 but a molded rigid shell formed from plastic or the like is also contemplated. Securing strap 22 is stretchable along its length and preferably is comprised of the same commercially available woven elastic material as used for straps 12, 13, and 14.

The preferred attachment means for securing mobile telephone 20 to article 10 comprises a commercially available clip assembly which includes slotted clip 19 and button 18 as seen in FIG. 1. Button 18 has a lower planar disc, which is slideable through aperture 16 of pocket 15. The lower planer disc is connected by a small diameter shaft to an upper planar disc having adhesive layer 21 therein for connection to mobile telephone 20. The slot of clip 19 is wider than the diameter of the shaft of button 18 but is narrower than the diameter of the lower planar disc of button 18. Button 18 is therefore engageable by the slot of clip 19. Slotted clip 19 slides over elastic securing strap 22 into open end 17 of pocket 15 to engage button 18 and is secured therein by strap 22. Strap 22 will relax to an unstretched state if stretched during insertion of clip 19. During removal of mobile telephone 20, clip 19 may stretch strap 22 as required for disengagement with button 18.

Figure 2:
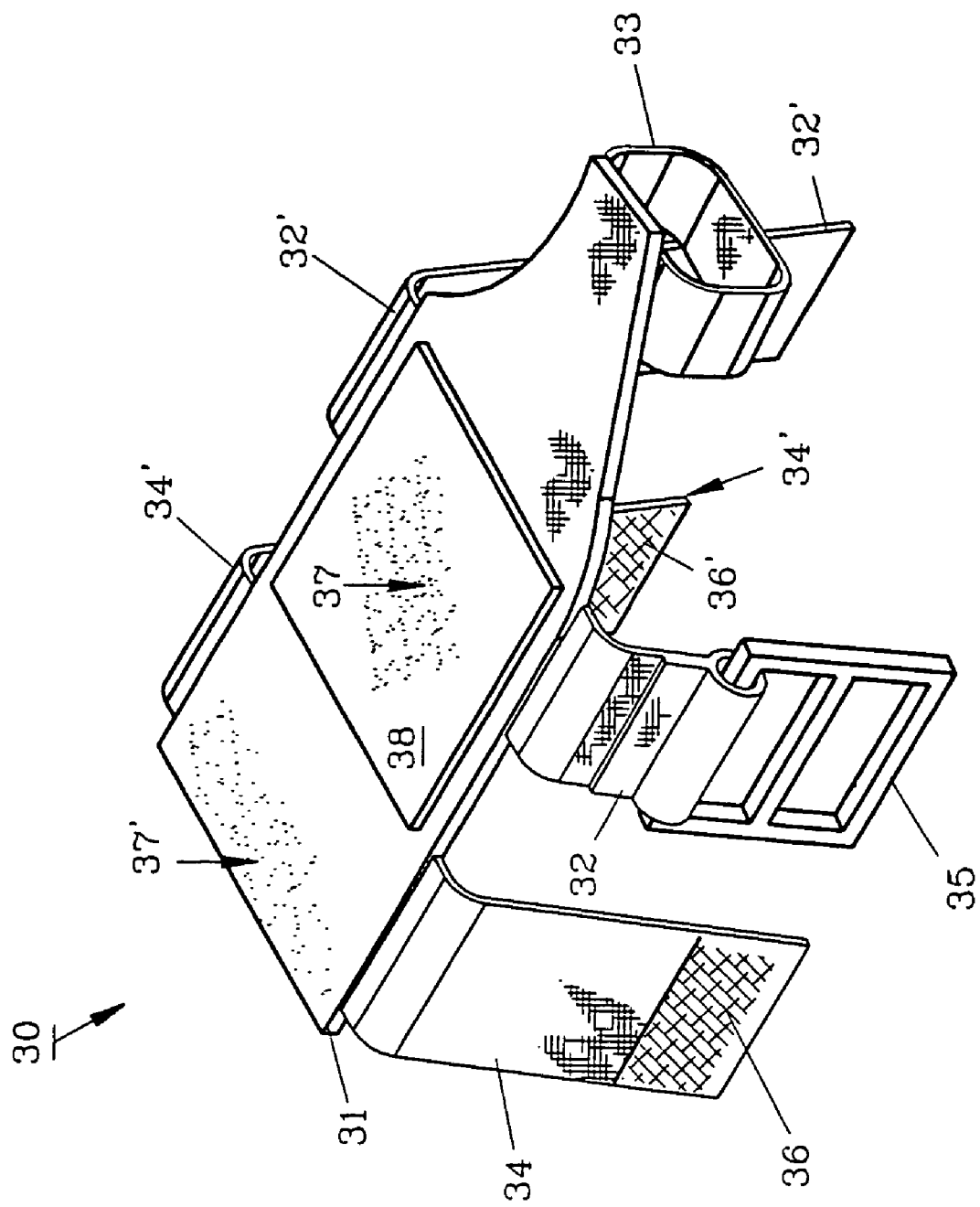
FIG. 2 shows an alternate embodiment of the article as seen in FIG. 1, having a pair of means for attachment to an electronic device.

FIG. 2 shows alternate article 30 for transporting a plurality of attachable electronic devices. The first strap is comprised of two halves, 32 and 32'. First strap half 32 is joined to body 31 at one end and includes buckle 35 at the other end. First strap half 32' is joined to body 31 at one end and its open end is slideable through buckle 35 for engagement therewith to complete the first strap. The third strap is comprised of two halves, 34 and 34' each joined to body 31 at one end and including hook and loop fasteners 36, 36' on the opposite ends for attachment in a manner engageable when the ends are overlapped. An adhesive layer attached to the open ends of third strap halves 34, 34' is also contemplated in place of hook and loop fasteners 36, 36'. Second strap 33 is an endless band joined to body 31 and is placed around a wearer's finger when article 30 is adorned. Acceptable materials for straps 32, 32', 34, 34' and 33 is similar to that of straps 12, 13 and 14 previously described for the preferred embodiment seen in FIG. 1.

FIG. 2 shows stiffening member 38 joined to body 31 with an adhesive, (not seen) though affixing it to body 31 with stitching is also contemplated. The primary means of removable attachment of mobile telephone 20 consists of adhesive layer 37 on stiffening member 38, while attachment to body 31 is also contemplated when stiffening member 38 is joined to the underside of body 31 or between layers of a multi-layered body 31 (not shown). A secondary means of attachment, consisting of adhesive layer 37' is spaced separate and apart from adhesive layer 37 whereby article 30 is capable therefore of transporting a plurality of electronic devices. Stiffening member 38 is preferably joined to body 31 with a permanent adhesive.

Figure 3:
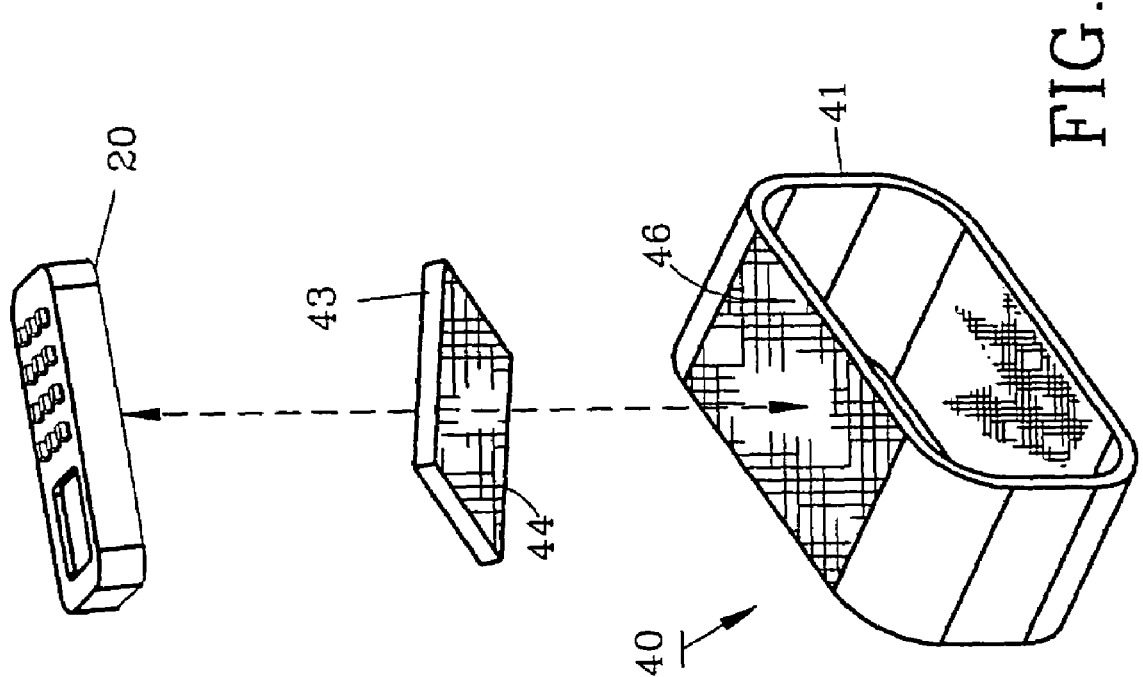
FIG. 3 illustrates a second alternate embodiment thereof in somewhat exploded fashion.

FIG. 3 shows alternate article 40 for transporting an attachable electronic device, such as mobile telephone 20. Single strap 41 is joined at both ends to form a continuous band with a means for attachment. The means for attachment comprises commercially available hook and loop fasteners 44 and 46. First fastener 46 is affixed to strap 41 with an adhesive (not seen) while affixing with stitching is also contemplated. Second fastener 44 is attachable to mobile telephone 20 by adhesive layer 43 atop fastener 44. First fastener 46 is cooperatively engageable with second fastener 44. Other attachment means contemplated include adhesives, a commercially available clip assembly, buttons, and a snap system. Strap 41 is also contemplated as having open ends engageable by the wearer with hook and loop fasteners, adhesives, or a buckle.

Although mobile telephone 20 is shown in FIGS. 1 and 3, the present invention contemplates attaching a variety of similarly sized portable electronic devices including personal data assistance, global positioning systems, personal gaming systems, and the like.

The illustrations and examples provided herein are for explanatory purposes and are not intended to limit the scope of the appended claims.

I claim:

1. An article for transporting an electronic device on a wearer's upper extremity, said article comprising:
   a) a strap, said strap for affixing to the wearer's upper extremity; and
   b) a means to attach an electronic device, said attaching means comprising a flexible pocket, said flexible pocket affixed to said strap, a clip, said clip defining a channel, a button, said button slidably engaged with said channel, said flexible pocket defining an aperture and a chamber, said chamber containing said clip, and said button engaged with said aperture.

2. The article of claim 1 wherein said button is affixed to said electronic device.

3. The article of claim 1 wherein said flexible pocket comprises two edges, said edges immovably and directly affixed to said article.

4. The article of claim 1 wherein said strap is adjustable.

5. An article for transporting an electronic device on a wearer, said article comprising:
   a) a body;
   b) a means of attaching an electronic device, said attaching means affixed to said body and comprising a first hook and loop fastener and a second hook and loop fastener, said first hook and loop fastener engageable with said second hook and loop fastener, a clip, said clip defining a channel, a button, said button slidably engaged with said channel, a pocket, said pocket defining an aperture and a chamber, said pocket affixed to said body, said chamber containing said clip and said button engaged with said aperture;
   c) a first strap, said first strap affixed to said body for securing said body to the hand of the wearer;
   d) a second strap, said second strap affixed to said body for securing said body to the middle finger of the wearer; and
   e) a third strap, said third strap affixed to said body for securing said body to the wrist of the wearer.

6. The article of claim 5 wherein said pocket further comprises an elastic layer, said elastic layer within said chamber.

7. The article of claim 5 wherein said button is affixed to said electronic device.

8. The article of claim 5 wherein said pocket comprises two edges, said edges immovably and directly affixed to said body.

9. The article of claim 5 wherein said first strap, said second strap and said third strap are each adjustable.

10. The article of claim 5 wherein said attaching means comprises an adhesive.

11. The article of claim 5 further comprising a stiffening member, said stiffening member joined to said body.

12. The article of claim 5 wherein said first strap, said second strap and said third strap each comprises a strap tightening mechanism.

13. The article of claim 5 wherein said body is located on the top of the wearer's hand.

14. The article of claim 5 wherein said strap tightening mechanisms are located on the side opposite of the wearer's hand relative to said body.

15. The article of claim 5 wherein said first strap, said second strap and said third strap are each elastomeric.

* * * * *